United States Patent [19]

Fitch et al.

[11] Patent Number: 5,673,776
[45] Date of Patent: Oct. 7, 1997

[54] PINION MOUNTED PARKING BRAKE

[75] Inventors: Donald W. Fitch, Angola; Grant N. Messmann, Ft. Wayne, both of Ind.

[73] Assignee: Dana Corporation, Toledo, Ohio

[21] Appl. No.: 612,557

[22] Filed: Mar. 8, 1996

[51] Int. Cl.⁶ ................................................ F16H 48/30
[52] U.S. Cl. ................................................ 192/4 A; 475/237
[58] Field of Search .................................. 475/231, 237; 192/4 A

[56] References Cited

U.S. PATENT DOCUMENTS

| | | | |
|---|---|---|---|
| 2,507,306 | 5/1950 | Jameson | 192/4 A |
| 2,876,658 | 3/1959 | McColl | 74/710.5 |
| 3,439,785 | 4/1969 | Hughson | 192/4 A |
| 3,439,786 | 4/1969 | Schmid | 192/4 A |
| 3,498,154 | 3/1970 | Müller-Berner | 74/710.5 |
| 3,517,572 | 6/1970 | Schmid | 192/4 A |
| 3,526,302 | 9/1970 | Grant et al. | 188/170 |
| 3,640,360 | 2/1972 | Dollase | 192/4 A |
| 3,642,103 | 2/1972 | Schott | 192/4 A |

Primary Examiner—Dirk Wright
Attorney, Agent, or Firm—Oldham & Oldham Co., LPA

[57] ABSTRACT

A vehicle drive mechanism as shown and described includes both a differential lock and an operating mechanism therefor, and a parking brake and an actuator mechanism therefor, in which the mechanism is constructed and arranged so that the differential lock mechanism can be actuated to lock out the differential without applying the parking brake so that application of the parking brake always locks out the differential. This may be accomplished by means of an actuator mechanism which includes a mechanical linkage extending from a parking brake piston surrounding the input shaft of the vehicle to a slidable member which engages a differential locking member in order to lock the differential. This linkage includes a slotted link which permits actuation of the differential lock independently of the vehicle brake, while inter-locking the vehicle brake actuator with a differential lock actuator so that setting the vehicle brake will always lock the differential.

8 Claims, 2 Drawing Sheets

PINION MOUNTED PARKING BRAKE

TECHNICAL FIELD

This invention relates to vehicle drive mechanisms and, more particularly, to vehicle drive mechanisms which include both a differential lock and operating mechanism therefor, and a parking brake and actuator mechanism therefor. In particular, this invention provides a drive axle assembly which is especially useful in off-road vehicles and which combines a differential lock and a parking brake actuator mechanism into a single assembly.

BACKGROUND OF THE INVENTION

Off-road vehicles, such as back hoes and other vehicles used in construction, high-lift fork trucks and logging equipment, typically operate on rough terrain. The terrain may be very uneven and is frequently muddy. Such vehicles require a differential (as do all automotive vehicles) to permit co-axial drive wheels to rotate at different speeds when the vehicle is turning. Such vehicles also require a differential lockout mechanism or, more simply, a differential lock, so that the vehicle will have traction even when only one of the drive wheels engages a hard surface. This is frequently the case when a vehicle is operating on rough terrain (when one of the wheels may be up in the air while the other is on solid ground) or when the vehicle is operating in mud. Such vehicles also require a parking brake so that the vehicle may be parked without rolling when not in use as, for example, overnight.

Differential lockout mechanisms or, more simply, differential locks are well known in the art. These embrace a variety of structures and are used both on automobiles and off-road vehicles.

Parking brakes are also well known. An automobile typically uses a mechanical parking brake. Off-road vehicles, on the other hand, are more likely to employ a hydraulic parking brake.

When a vehicle (say an off-road vehicle) has a hydraulic parking brake but no differential lock (or a differential lock which is unlocked), one of the two drive axle shafts is free to rotate even with the parking brake set. In that case, the vehicle would rotate in an arc. Movement of the vehicle in an arc is more circumscribed and, hence, less dangerous than linear movement which would result if there were no parking brake and both drive axle shafts were free to rotate; nevertheless, such movement is to be avoided.

Up to now, no one has provided a unitary drive axle mechanism which incorporates both a differential lock and a parking brake actuator mechanism, and, in particular, no one has provided a unitary axle assembly of this type in which a parking brake mechanism and the differential lock are so interconnected that the differential lock is always in locked position whenever the parking brake is set.

SUMMARY OF THE INVENTION

This invention provides a drive mechanism comprising an input shaft, a differential driving connected to the input shaft, and first and second output shafts drivingly connected to the differential and capable of being driven at different speeds, wherein the vehicle drive mechanism further comprises a differential lock, a differential lock actuator, a parking brake, and a parking brake actuator, and in which the drive mechanism is constructed and arranged so that the differential lock can be applied independently of the parking brake but so that activation of the parking brake simultaneously locks the differential lock.

A major advantage of this invention is that it assures that the differential lock will always be locked whenever the parking brake of the vehicle is set, while permitting a vehicle operator to actuator a differential lock mechanism and thereby lock the differential independently of the parking brake, so that the differential can be locked when the vehicle parking brake is not set.

DESCRIPTION OF THE PREFERRED EMBODIMENTS

This invention will now be described in detail with reference to the preferred embodiment thereof as illustrated in the accompanying drawings. In the preferred embodiment, the drive mechanism is a drive axle assembly and the output shafts are coaxial axle shafts. The preferred embodiment illustrated is particularly useful in off-road vehicles, such as construction vehicles and logging trucks. Such vehicles typically have hydraulic parking brakes.

Figure 1:
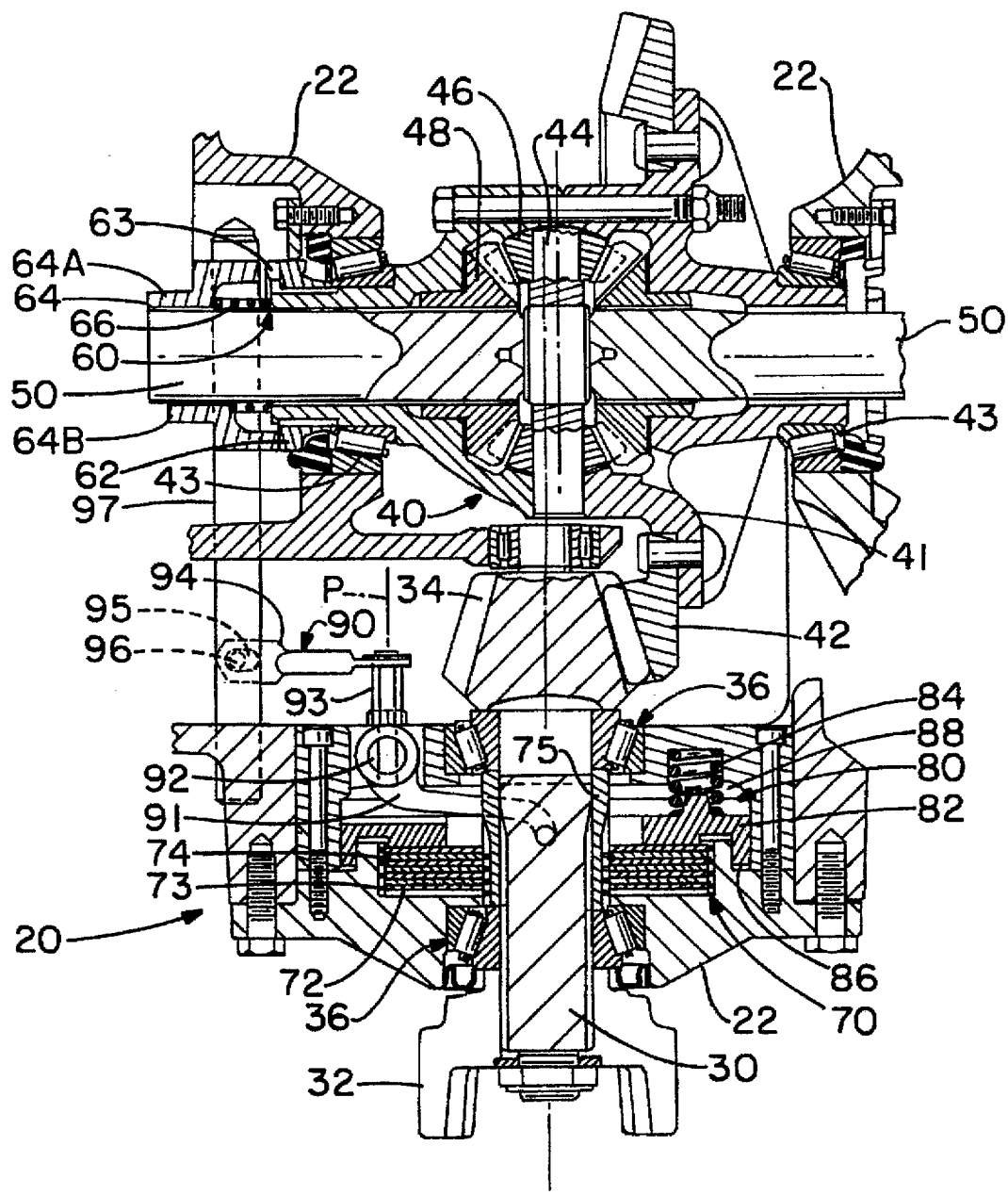
FIG. 1 is a sectional plan view of a drive axle assembly according to a preferred embodiment of this invention with a portion of the linkage which interconnects the brake actuator mechanism with a differential lock are omitted.
Figure 2:
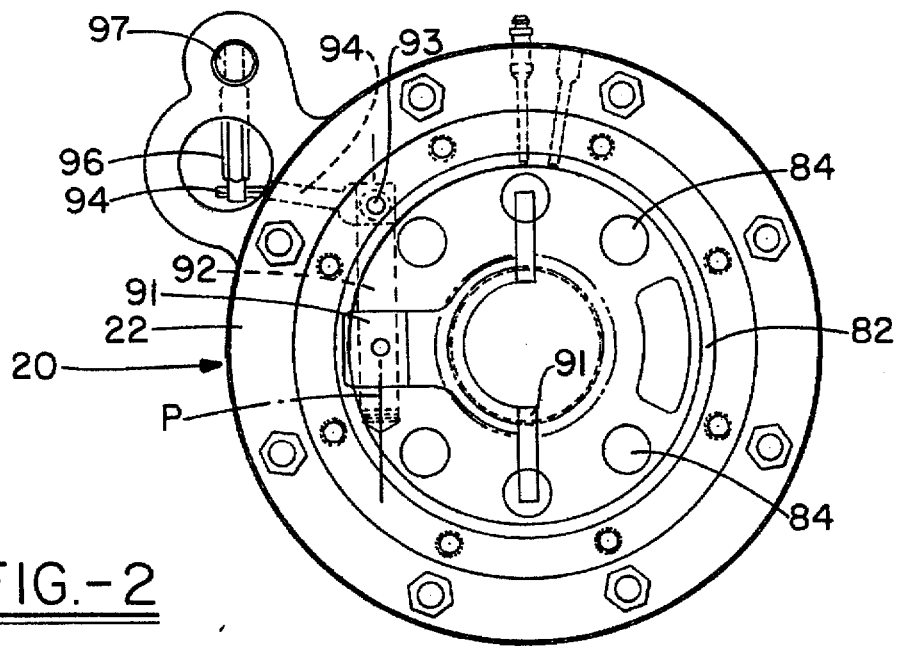
FIG. 2 is a front elevational view of the apparatus shown in FIG. 1 with certain parts omitted.
Figure 3:
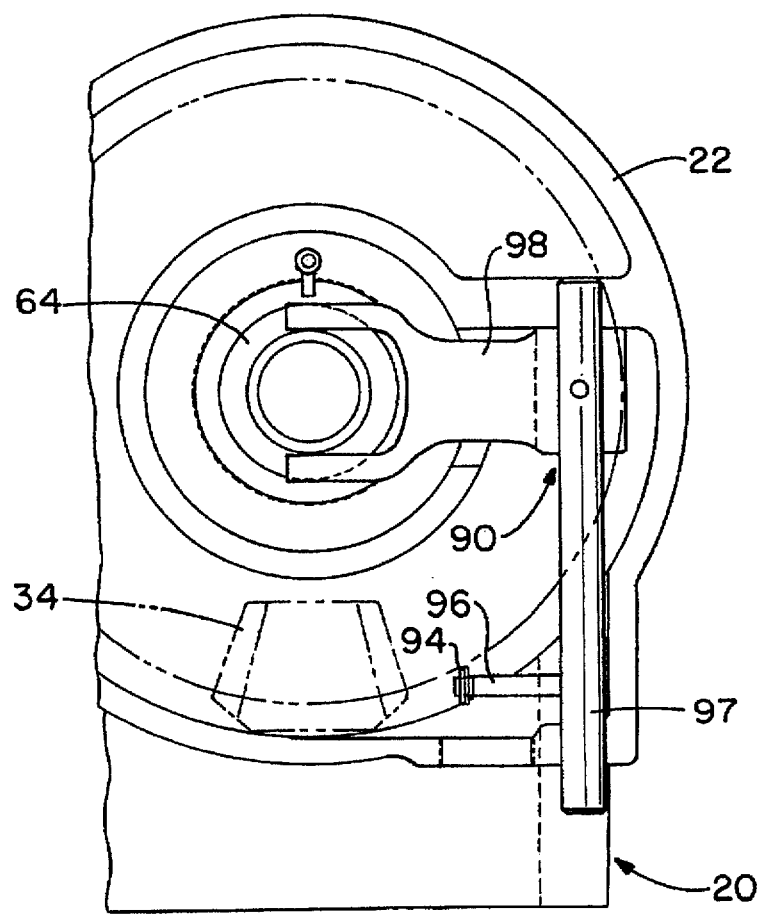
FIG. 3 is a side elevational view of the apparatus shown in FIG. 1.

Referring now to the drawings and especially to FIG. 1, 20 is a device in accordance with a preferred embodiment of this invention. This device, a vehicle drive assembly, comprises a housing 22, which consists of a plurality of pieces bolted together.

A longitudinally extending input shaft 30 receives power from an engine (not shown) via a transmission (not shown) and transmits torque to drive wheels (also not shown). Input shaft 30 is coupled at one end to a drive shaft (not shown) by means of a universal joint 32. A pinion 34 is formed on the other (or second) end of input shaft 30. Input shaft 30 is typically on the longitudinal center line of the vehicle. Input shaft is journaled for rotation in housing 22 by means of two sets 36 of roller bearings. Input shaft 30 extends through a wall of housing 22 the first end of the input shaft is outside housing 22 and the second end is inside the housing.

A differential 40, which may be of conventional structure, is drivingly connected to input shaft 30. Differential 40 comprises a differential case 41 and a ring gear 42, which are bolted together and which rotate about a transverse axis (the axis of axle shafts to be described later). Differential case 41 is rotatably supported in housing 22 by means of roller bearings 43. Differential 40 further comprises spider pins 44, which carry bevel gears 46, which, in turn, mesh with and drive side gears 48. Bevel gears 46 rotate about a longitudinal axis, which may be slightly off center (as shown) from the axis of axle shaft 30. The side gears 48 rotate about a transverse axis, which is the axis of the axle shafts 50.

A pair of co-axial axle shafts (or output shafts) 50 extend transverse outwardly from differential 40 to drive wheels (not shown) on either side of the vehicle. Side gears 48 surround the inner ends of axle shafts 50 and are keyed thereto by splines (unnumbered), so that the axle shafts 50 are driving connected to differential 40 and rotate with respective side gears 48. The differential 40 makes it possible to drive axle shafts 50 at different speeds, as is well known.

A differential lock out mechanism, or simply a differential lock 60, is provided. This enables the vehicle operator to lock out the differential and cause both axle shafts 50 to rotate at the same speed. Differential lock 60 comprises an annular collar 62 surrounding one of the axle shafts 50 and splined to differential case 41 so as to rotate therewith. Collar 62 has one or more teeth 63. Differential lock 60 further comprises a slidable annular dog clutch 64 having one or more teeth 65 thereon. Dog clutch 64 is a sleeve splined to and therefor rotatable with an axle shaft 50. Dog clutch 64 is slidable between a first (or unlocked) position 64A (shown above the axis of axle shafts 50 in FIG. 1) in which it is out of engagement with collar 62, and a second (or locked) position 64B (shown below the axis of axle shafts 50 in FIG. 1) in which it engages collar 62, locking out differential 40 and causing the two axle shafts to rotate at the same speed. A spring 66 biases the dog clutch 62 to the first or unlocked position. A manual differential lock actuator (not shown), typically located on the floor board of the vehicle, enables the operator to lock out the differential when desired. This is accomplished by moving the dog clutch 64 into engagement with collar 62 against the bias of spring 66. The operator will typically lock out the differential when the wheels driven by respective axle shafts 50 encounter unequal traction, as for example in mud.

The device 20 of this invention further includes a parking brake mechanism 70. The parking brake mechanism 70 comprises a brake clutch pack 72, which, in turn, includes a stationary first set of annular disks or plates 73 which are fixedly mounted in housing 22, alternating with a rotary second set of annular disks or plates 74 which are secured to an annular hub or sleeve 75 which surrounds and rotates with input shaft 30. The two sets of disks are spaced slightly apart to permit free relative rotation when the parking brake is released. The braking system 70 is a fail-safe system in which the two sets of plates 73 and 74 are compressed together so as to engage or apply the brakes when the hydraulic system of the vehicle is shut down.

Actuation of the parking brake clutch pack 72 is accomplished with a parking brake actuator (or actuator system) 80. Parking brake actuator 80 includes an annular piston 82 which is reciprocable between a brake engaging position and a brake disengaging position, a plurality of circumferentially spaced compression springs 84 which urge the piston toward the brake-engaging position, a first hydraulic fluid chamber 86 containing hydraulic fluid which is under pressure when the vehicle is in operation and the engine is turned on, and a second hydraulic chamber 88 which is at atmospheric pressure. Hydraulic fluid under pressure in first hydraulic chamber 86 urges the piston away from the brake clutch pack (upwardly as seen in FIG. 1, horizontally as installed in a vehicle) in opposition to the bias of springs 84.

The advantages of this invention are achieved by means of a novel differential lock actuator which will now be described in detail. The differential lock actuator includes a mechanical linkage 90, which makes it possible to apply the differential lock independently of the parking brake but which will automatically apply the differential lock and thereby lock the differential 40 when the parking brake is engaged. Mechanical linkage 90 comprises, in the order named, a bifurcated brake lever 91 having two arms and a shaft and rotatable about a pivot axis P when piston 82 reciprocates, a rotatable brake lever rod 92, a first linkage arm 93, a second linkage arm 94 having a longitudinal slot 95 therein, a third linkage arm 96, a rotatable differential lock lever rod 97, and a bifurcated differential lock lever 98 which has a shaft linked to differential lock lever 97 and two prongs which bear against an end surface of differential lock dog clutch 64 and cause the dog clutch to reciprocate when lever rod 97 rotates. The slot 95 in the second linkage arm 94 makes it possible to actuate the differential lock (by means of a manual actuator not shown) without any movement of the brake 72, while always assuring that the differential lock will be actuated whenever brake 72 is applied.

Details of a mechanical linkage for a system of this invention may vary. However, a preferred linkage will include a first lever (91) which responds to movements of a brake piston (82) a second link or lever (98) remote from the first lever for slidably actuating a differential locking member (64) and a slotted link (94) between the first and second links or levers for providing a slotted connection which permits actuation of the differential lock independently of the brake while providing an inter-lock mechanism so that actuation of the parking brake will always actuate the differential lock to place the differential in locked position.

The differential lock linkage of this invention can be modified for incorporation into a vehicle having a mechanical brake. This can be accomplished by removing the springs 84, relocating the forked brake lever 91 so that it pushes against the piston 82, extending the shaft of forked lever 91 to the exterior of the a axle housing 22, and adding an actuating lever.

FIG. 1 illustrates the system of this invention when a vehicle is at rest. In such case, the brake 72 is set, the disks comprising this brake are compressed, the piston 82 is at the lowermost position of its travel, and the bifurcated brake lever 91 is in its "down" position. When the vehicle is running, the piston 82 and brake lever 91 are up, and the disks or plates comprising the brake clutch pack 72 are slightly spaced apart so that input shaft 30 can rotate.

Operation of a system in accordance with this invention will now be described. References to direction of movement are as seen in FIG. 1 except where otherwise stated.

When a driver of a vehicle which includes the system of this invention parks, the driver first engages a parking brake, which is typically a manually operated switch on the dashboard of the vehicle. When the parking brake is set, or when the vehicle motor is shut off, pressure in the first hydraulic chamber 86 drops to atmospheric pressure, the springs 84 take over and move the piston 82 into contact with the disks or plates of the brake clutch pack 72, compressing the plate together so as to apply the brake. Compression of the disks or plates together stops rotation of input shaft 30 (because of friction between the two sets of plates 73 and 74). Movement of the piston causes the brake lever to rotate in a clockwise direction. This causes the brake lever rod 92 and the first linkage arm 93 also to rotate clockwise. This causes the slotted second linkage arm 94 to pull to the right (toward the longitudinal center line of the vehicle). This, in turn, also pulls the third linkage arm 96 (seen on end in FIG. 1 ) to the right. This causes counter-clockwise rotation of the differential lock lever rod 97. This causes the bifurcated end of differential lock lever 98 to move to the right as seen in FIG. 1 (because of rotation of the differential lock lever 98), causing the bifurcated end of the differential lock lever 80 to engage the dog clutch 64 to move it to the right and into engagement with the toothed collar 62. This locks the differential lock and causes the two output shafts 50 to rotate at the same speed.

Suppose that the vehicle is operating in mud and the operator wishes to lock the differential without applying the brake. Slot 95 in second link 94 permits this. The operator engages the manual differential lock actuator (not shown)

which is normally on the floor of the vehicle cab. This causes the differential lock lever rod 97 to rotate counter clockwise. The third linkage arm 96 and the differential lock lever 98 rotate with the differential lock lever arm 97. The differential lock lever 98 engages the dog clutch 64 as previously explained, causing the dog clutch 64 to move to the right as seen in FIG. 1 into engagement with the differential lockout collar 62, thereby locking out the differential.

The present invention provides a mechanism which assures that the differential of the vehicle will always be locked out whenever the brake is applied, while, at the same time, permitting the differential lockout to be actuated when the brake is "off." This allows the vehicle operator to lock out the differential as needed without applying the brakes but always assures that the differential will be locked out whenever the brakes are applied and whenever the vehicle is not in operation. This is a safety feature which applies braking action to both output shafts so that the vehicle cannot roll either in a straight line or in an arc when the brake is set.

While this invention has been described in detail with particular reference to the best mode and preferred embodiment thereof, it will be apparent that various modifications can be made without departing from the scope or spirit of this invention.

What is claimed is:

1. A vehicle drive mechanism comprising an input shaft, a differential drivingly connected to said input shaft, and first and second output shafts drivingly connected to said differential and capable of being driven at different speeds, said vehicle drive mechanism further comprising a differential lock, a differential lock actuator, a parking brake and a parking brake actuator therefor, said drive mechanism being constructed and arranged so that the differential lock can be applied independently of the parking brake but so that application of the parking brake when the differential lock is unlocked simultaneously locks the differential lock.

2. A vehicle drive mechanism according to claim 1 wherein said parking brake is a hydraulic parking brake.

3. A vehicle drive mechanism according to claim 1 wherein said input shaft is a pinion shaft having on one end thereof a pinion which is in driving engagement with said differential.

4. A vehicle drive mechanism according to claim 1 wherein said differential lock comprises a sleeve slidably but non-rotatably mounted on one of said output shafts and slidable in and out of engagement with a differential gear, said differential being locked when said sleeve is in engagement with said differential gear.

5. A vehicle drive mechanism according to claim 1 wherein said input shaft is a pinion shaft having on one end a pinion which drives said differential.

6. A vehicle drive mechanism according to claim 1 wherein said parking brake actuator includes a lever mounted on said input shaft.

7. A vehicle drive mechanism according to claim 1 in which:

said differential includes a differential case co-axial with said axle shafts and in direct drive relationship with said input shaft;

said differential lock includes an annular clutch member slidably but non-rotatably mounted on one of said output shafts, said clutch member being slidable between a first position out of engagement with said differential case and a second position in engagement with said differential case, said differential being locked when said annular clutch member is in said second position; and said parking brake actuator comprises a reciprocable annular piston surrounding said input shaft and reciprocable between a first position in which the parking brake is released and a second position in which said parking brake is applied; and said differential lock actuator includes a mechanical linkage comprising a first lever which rotates when said piston reciprocates, a second lever remote from said first lever for slidably moving said annular clutch member into engagement with said differential case, and a slotted link between said first and second levers, said slotted link having a slot therein permitting actuation of said differential lock independently of said parking brake.

8. A vehicle drive mechanism according to claim 1 in which said vehicle drive mechanism is a vehicle drive axle assembly and said output shafts are coaxial axle shafts.

* * * * *